United States Patent [19]

Gonzalez et al.

[11] 4,206,686
[45] Jun. 10, 1980

[54] CANTILEVER BEAM POSITIONER FOR VALVE ACTUATORS

[75] Inventors: Ricardo Gonzalez, Holden; Charles A. Sumner, E. Princeton, both of Mass.; Robert E. Sanctuary, Amherst, N.H.

[73] Assignee: Worcester Controls Corporation, West Boylston, Mass.

[21] Appl. No.: 966,300

[22] Filed: Dec. 4, 1978

[51] Int. Cl.$^2$ ............................................. F15B 13/16
[52] U.S. Cl. ........................................ 91/386; 91/387
[58] Field of Search ................................. 91/387, 386

[56] References Cited

U.S. PATENT DOCUMENTS

| | | | |
|---|---|---|---|
| 671,465 | 4/1901 | Bornes | 91/387 |
| 2,789,543 | 4/1957 | Popowsky | 91/387 |
| 2,947,286 | 8/1960 | Baltus et al. | 91/387 |
| 3,693,501 | 9/1972 | Ward et al. | 91/387 |
| 3,915,062 | 10/1975 | Westfall et al. | 91/387 |
| 3,971,295 | 7/1976 | Nash | 91/387 |

Primary Examiner—Paul E. Maslousky
Attorney, Agent, or Firm—Pollock, VandeSande and Priddy

[57] ABSTRACT

A pneumatic valve actuator having a rotatable output shaft is provided with a valve positioner comprising an axially displaceable spool valve and a pneumatic transducer responsive to applied signal air pressure for displacing the spool valve away from a neutral position to effect rotation of the actuator output shaft. The actuator output shaft is gear-connected to an element which rotates with the output shaft, and an elongated cantilever beam spring attached at one end to the rotatable element extends in a direction transverse to the axis of rotation of said element to the transducer for providing a feedback force which balances the control signal responsive transducer force when the actuator output shaft has rotated to a desired position.

12 Claims, 4 Drawing Figures

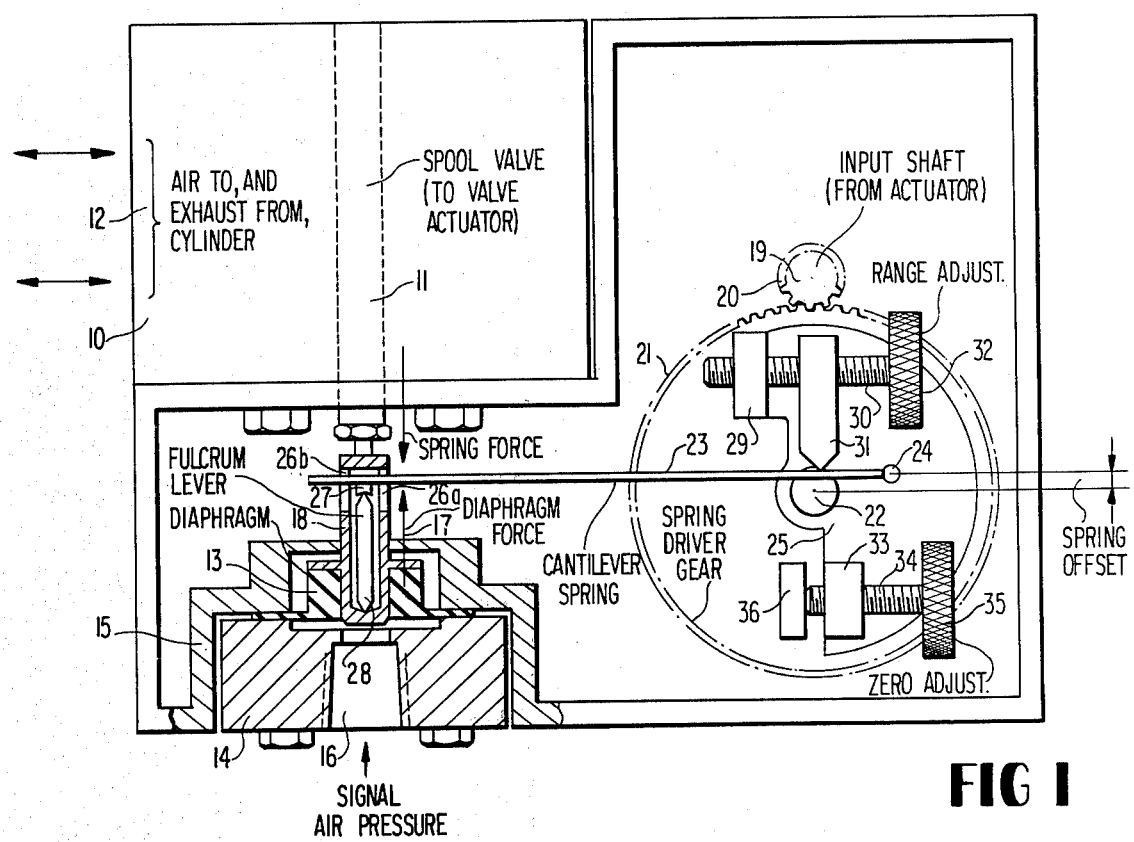
FIG 1
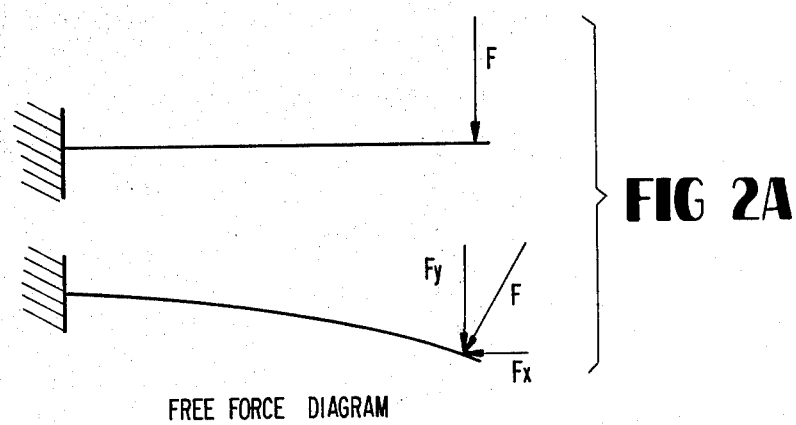
FIG 2A
FREE FORCE DIAGRAM
FIG 2B
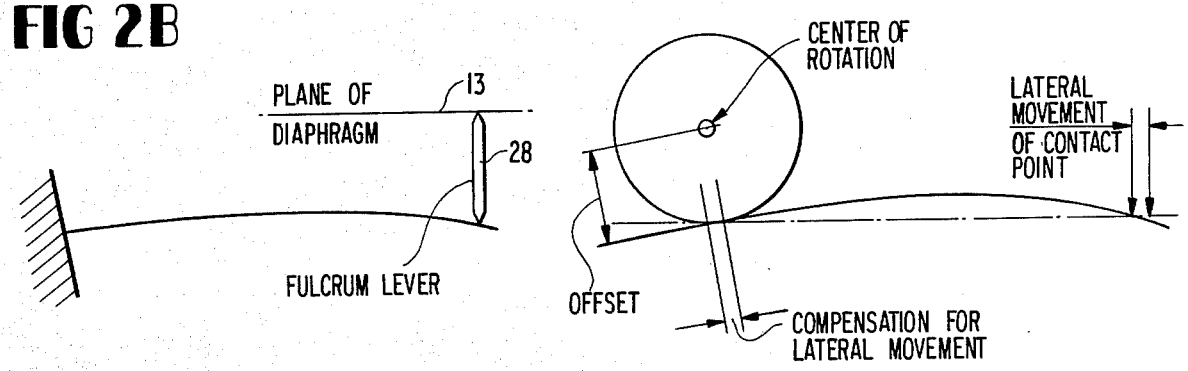
FIG 3

CANTILEVER BEAM POSITIONER FOR VALVE ACTUATORS

BACKGROUND OF THE INVENTION

The present invention is concerned with an improved pneumatic positioner which utilizes a cantilever beam spring as the balancing force in the feedback mechanism of a pneumatic positioner, and which is arranged to compensate for and eliminate lateral forces on the spool valve conventionally employed in the positioner mechanism.

Pneumatic positioners are, in themselves, well known, and constitute mechanism devices which provide the required control to position valves in a throttling mode. More specifically, pneumatic positioners operate to position a valve in accordance with a predetermined mathematical relationship to an analog pneumatic pressure signal. The force created by the analog signal acts on a diaphragm, which is, in turn, coupled to a spool valve in the positioner mechanism for displacing the spool valve thereby to effect rotation of a valve actuator and a valve connected thereto, and the signal pressure acting on the diaphragm is balanced against another force which is controlled by a feedback loop reacting to the position of the valve being controlled. When these two forces are in balance, a null point is reached and the positioner stops the motion of the valve. This position control can be accomplished by a spool valve opening or closing the flow of air to a pneumatic actuator mounted directly on the valve.

Arrangements of the general type discussed above normally employ a coil spring in the feedback mechanism of the positioner. Typical such positioners employing coil springs are shown in the U.S. Pat. Nos. to Barlow 3,954,045, Wittren 3,511,134, Baumann 3,293,992, and Ray 3,151,531. These references illustrate other features of such positioners e.g., the possibility of employing an electrically controlled solenoid as the transducer rather than a pneumatic transducer responsive to signal air pressure.

Known systems of the type described above fail to provide a number of highly desirable features. By way of example, and without any attempt to be all-inclusive, it is desirable that the positioner have as few parts as possible and, more particularly, as few pivot points as possible, since any wear in the feedback mechanism of the positioner will result in inaccuracies of the performance of the positioner. The fewer the pivot points, the smaller the wear and therefore the smaller the backlash. It is desirable, moreover, that the mechanism be capable of repeating a desired control operation without frequent calibration or readjustment. In addition, the positioner should have the lowest cost possible without sacrificing performance, ruggedness or reliability.

These highly desirable features are all achieved in the present invention and, more particularly, are achieved by elimination of the coil spring feedback mechanism which has typically been employed heretofore, and the replacement of such a coil spring mechanism by a cantilever spring beam arrangement. Spring beams, per se, have been employed heretofore in other types of control mechanisms, e.g., mechanisms of the type shown in Jenney, U.S. Pat. No. 3,455,318 and Gordon et al, U.S. Pat. No. 3,339,572. However, the arrangement employed in the present invention is quite different from those employed in these prior devices.

SUMMARY OF THE INVENTION

In contrast to prior positioner designs which have generally employed a coil spring to provide the force against which the signal pressure is balanced, the present invention uses a cantilever beam spring to provide the balancing force against the signal pressure. This cantilever beam spring also replaces one or more elements of the feedback mechanism, thus simplifying the design of the overall unit.

The positioner may employ a pneumatic transducer (although other forms of transducer can also be employed) comprising a diaphragm to which signal air pressure is applied to create a signal force. This signal force moves a spool valve in the positioner to allow air to flow to the valve actuator, thus initiating motion of the valve shaft which is connected to said actuator. This motion is fed back to positioner gears which are directly connected to the cantilever spring beam so that, as the actuator moves, the cantilever beam spring will flex, thereby increasing the spring force which it generates in opposition to the signal force. The cantilever beam deflects in proportion to the applied loading on one end thereof, and when the cantilever beam force equals the signal diaphragm force, a null point is reached and the spool valve cuts off the air flow to the actuator.

The free end of the cantilever spring beam is connected through an elongated fulcrum lever of pin or needle configuration to the center of the diaphragm in the pneumatic transducer, and preferably contacts the diaphragm at the plane of the diaphragm. The elongated fulcrum lever is, moreover, normally disposed in co-axial relation to the spool valve of the positioner, and these features tend to insure that the forces supplied to the spool valve are truly axial so as to avoid any sideloading of the spool valve or any tendency of the spool valve to rock or to shift sideways due to the feedback forces. This elimination of all lateral forces which may act on the spool of the spool valve eliminates friction in the spool valve, assures that the spool valve floats free on a layer of air in its associated cylinder, eliminates the jerky motion and erratic operation which the spool valve would tend to exhibit if it encountered friction as it was axially displaced, and accordingly, provides a positioner operation which is far more accurate than has been possible heretofore.

The overall structure is extremely simple in terms of the number of elements in the feedback mechanism, and is particularly characterized by its minimization and elimination of pivot points. It provides a very accurate and sensitive mechanism which can be built relatively inexpensively in very rugged designs. Moreover, because of the fewer pivot points which are provided, and the combined functions which are achieved by the various elements of the mechanism, the feedback loop in the positioner is more direct and therefore more precise.

BRIEF DESCRIPTION OF THE DRAWINGS

The foregoing objects, advantages, construction and operation of the present invention will become more readily apparent for the following description and the accompanying drawings wherein:

FIG. 1 is a cross-sectional view of a cantilever beam positioner constructed in accordance with the present invention;

FIGS. 2A and 2B are force diagrams illustrating certain aspects of the operation of the positioner of FIG. 1; and, FIG. 3 diagrammatically illustrates the compensation which is achieved by the beam spring offset illustrated in FIG. 1.

DESCRIPTION OF THE PREFERRED EMBODIMENTS

A valve positioner constructed in accordance with the present invention is illustrated in FIG. 1. It comprises a cylinder 10 having a spool valve 11 therein mounted for axial displacement in a ported housing and operating to control the ducting of high pressure air at an inlet port to outlet ports, while simultaneously ducting other ports to exhaust. These ports have been generally designated at 12. The spool valve is adapted to be selectively displaced by a signal-responsive transducer which is connected thereto, and when displaced, operates to control the flow of pneumatic pressure to and from a valve actuator (not shown) which, in turn, has an output shaft that rotates to position a valve, e.g., a rotary ball or plug valve connected thereto.

In the particular embodiment of the invention shown in FIG. 1, the transducer is of the pneumatic type and comprises a flexible diaphragm 13 of circular cross-section whose periphery is confined between a pair of body members 14, 15. Body member 14 includes a port 16 to which signal air pressure may be applied. Ordinarily, a nominal air pressure is applied to port 16 at all times, and an actuating signal is provided by increasing the signal air pressure at port 16 above its nominal value. When such signal air pressure is applied to port 16, the diaphragm 13, whose center is co-axial with the axis of elongated spool valve 11, flexes upwardly in the direction indicated by arrow 17, the body member 15 being provided with an interior cavity of sufficiently large dimension to permit such motion of diaphragm 13. The center of diaphragm 13 is connected to spool valve 11 by a mechanical linkage which includes an elongated hollow tubular member 18 disposed co-axial with the spool valve 11 for applying forces from the diaphragm co-axially to spool valve 11.

When spool valve 11 is displaced upwardly in its cylinder 10, the valve actuator (not shown) is caused to rotate in a manner well known, per se. The output shaft of the actuator is connected to, or acts as, an input shaft 19 in the positioner which is provided with a comparatively small gear member 20. Gear member 20, in turn, mesh engages a comparatively large spring driver gear 21 in the positioner. The tooth ratio between gears 20, 21 is such that rotation of gear 20 through a comparatively large angle (e.g., 90°) causes rotation of gear 21 through a comparatively small angle (e.g., 7°), about and axis 22.

An elongated cantilever beam spring 23 is attached at a point 24 to a segmentally shaped carrier plate 25 which is mounted on gear 21 for rotation therewith, and which is adapted to be angularly displaced relative to gear 21 about axis 22 for purposes of effecting certain adjustments which will be described hereinafter. The point of attachment 24 of cantilever beam spring 23 is, as illustrated, radially displaced from the axis of rotation 22 of gear 21 for reasons which will also be discussed hereinafter, and said cantilever beam spring 23 extends in a direction transverse to the axis of rotation 22 of gear 21 through a pair of elongated diametrically opposed apertures 26a, 26b in opposite sides of hollow tubular member 18. The portion of the free end of cantilever beam spring 23 within hollow tubular member 18 is provided with a seat 27 which engages a pointed upper end of an elongated fulcrum lever 28 of pin or needle configuration, and the lower end of said fulcrum lever 28, which is also of pointed configuration, engages the center of a conical depression at the bottom interior end of tubular member 18.

Carrier plate 25 supports a range adjusting mechanism comprising a nut 29 having an elongated bolt 30 passing therethrough, with bolt 30 in turn carrying a fulcrum member 31 whose lower pointed end engages cantilever beam spring 23 at a position displaced from attachment point 24. The actual point at which fulcrum member 31 engages the cantilever beam spring may be adjusted relative to attachment point 24 by rotation of a range adjustment knob 32. As will become apparent subsequently, when gear 21 is rotated, cantilever beam spring is caused to flex, and the spring force which is generated at the upper end of fulcrum lever 28 during this flexing operation can be adjusted by variation of the position of fulcrum member 31 relative to attachment point 24.

Carrier plate 25 further includes a zero adjustment mechanism comprising a further nut 33 which receives a bolt 34 that is adapted to be screwed into and out of nut 33 by a zero adjustment knob 35; and, the free end of bolt 34 bears on a fixed abutment 36 which is carried by the outer face of spring driver gear 21. Rotation of knob 35 accordingly causes an angular shifting of carrier plate 25 about axis 22 relative to gear 21; and this in turn varies the spring force which is generated at the free end of cantilever beam spring 23, to permit that force to be initially adjusted so that it equals and balances the force which is generated in the opposing direction by diaphragm 13 upon application of nominal air pressure to port 16.

In operation, the zero adjust mechanism 33-35 is initially adjusted so that there is a force balance between cantilever beam spring 23 and diaphragm 13, whereby diaphragm 13 is in a predetermined neutral position, spool valve 11 is similarly in a predetermined neutral position, and the valve actuator which is connected to gear 20 is at rest.

If a signal air pressure should now be applied to port 16, i.e., a pressure which is in excess of the aforementioned nominal pressure, diaphragm 13 will move upwardly, and its force will be transmitted through hollow tubular member 18 to spool valve 11 to cause said valve to be displaced upwardly so as to duct high pressure air to the valve actuator causing the actuator to commence rotation. As the output shaft of the actuator rotates, small gear 20 similarly rotates, and this causes rotation of gear 21 which, in turn, causes cantilever beam spring 23 to flex about fulcrum member 31 in a direction which increases the spring force at the free end of the cantilever beam spring. This increasing spring force is coupled through seat 27 and fulcrum lever 28 to diaphragm 13, at a point on the axial center of and in the plane of diaphragm 13. The spring force opposes the force being produced by diaphragm 13 and continues to increase until it is equal in magnitude to the signal air pressure force being exerted by diaphragm 13, at which time a force balance condition is achieved, the diaphragm returns to its neutral position, returning spool valve 11 to its neutral position, and rotation of the valve actuator ceases.

When it is desired to reverse the direction of rotation of the actuator, the signal pressure applied to port 16 is reduced back to the nominal air pressure which is normally applied to port 16 under quiescent conditions.

This reduction in air pressure applied to port 16 reduces the upward forces being exerted by the diaphragm 13, causing the diaphragm to flex downwardly; and this, in turn, operates through hollow tubular member 18 to shift spool valve 11 downwardly, causing the valve actuator to rotate in the opposite direction, which in turn causes rotation of gears 20, 21 in the opposite direction, reducing the flex of cantilever spring 23, and reducing the downward force applied by the free end of spring 23 to fulcrum lever 28 until the downward spring force is again in balance with the upward force being exerted by the diaphragm, at which time the valve actuator again comes to rest.

As discussed previously, it is highly desirable to eliminate all lateral forces which may act on the spool of the spool valve, since this eliminates friction and therefore provides higher accuracy in the positioner. Accordingly, the direction of the force from the diaphragm 13 should be applied co-axially with the spool 11. In the design shown in FIG. 1, two basic concepts are provided, which can be used concurrently or individually, to minimize or eliminate such lateral forces.

More particularly, as the deflection of the cantilever beam spring 23 increases, it is readily apparent that the contact point between the center of diaphragm 13 and the free end of the cantilever beam will tend to move laterally, and this will in turn tend to produce lateral components $F_x$ of force as shown in the free force diagrams of FIG. 2A. By utilizing a fulcrum lever 28 which is in engagement at its lower end with the center of diaphragm 13, and which is located within tubular member 18 in spaced relation to the interior wall of said tubular member, the "shortening" of the length of cantilever beam spring 23 due to its flexure, can operate to effect a corresponding tilting motion of fulcrum lever 28 as the point of contact between seat 27 and fulcrum lever 28 moves laterally, assuring that all lateral forces are applied directly to the plane of diaphragm 13, as shown in FIG. 2B. In this aspect of the invention, the diaphragm 13 will absorb the lateral components of force, thereby assuring that only axial forces $F$, $F_y$ are transmitted from the diaphragm to the spool valve, and further assuring that the feedback forces are transmitted to the diaphragm/spool assembly in a frictionless manner since there is no side-loading on the spool valve or on the direct linkage 18 between the diaphragm and spool valve.

FIG. 3 illustrates a further method of eliminating lateral components of force due to flexure of the cantilever beam spring, which may be used in place of or in addition to the approach discussed above. More particularly, as described earlier, the cantilever beam spring 23 is attached at a point 24 which is radially offset from the center 22 of spring driver gear 21. If the cantilever spring were attached directly at the center of the spring driver gear, when the spring was bent or flexed as a result of rotation of gear 21 the distance between the point of attachment of the spring to gear 21 and the point at which the free end of the spring engages fulcrum lever 28 would shorten. This would again create conditions of the type shown in FIG. 2A, wherein a lateral component of force $F_x$ was produced in addition to the desired axial force $F_y$. By offsetting the attachment point of the spring as shown in FIGS. 1 and 3, however, the spring attachment point moves toward the fulcrum lever 28 as the driver gear 21 rotates. The amount of offset of attachment point 24 is so selected that the distance it moves toward fulcrum lever 28 is substantially equal to the extent by which cantilever beam spring 23 is shortened due to its flexure, whereby the free end of the cantilever beam spring is maintained at a position substantially coaxial with the spool valve 11 as the spring beam is flexed.

The overall mechanism, by using a cantilever beam spring as described, is far simpler, and provides more reliability and accuracy at lower cost, than prior art valve positioners. Moreover, the device eliminates lateral forces which might affect the performance of the spool valve, and includes self-compensating arrangements which eliminate or minimize lateral motion of the cantilever beam/diaphragm force contact point.

While we have thus described a preferred embodiment of the present invention, many variations will be apparent to those skilled in the art. It must therefore be understood that the foregoing description is intended to be illustrative only and not limitative of the present invention, and all such variations and modifications as are in accord with the principles described are meant to fall within the scope of the appended claims.

Having thus described our invention, we claim:

1. In a valve positioner of the type employing a pneumatic valve actuator having a rotatable output shaft for effecting rotary positioning of a valve, an elongated axially displaceable spool valve located between said pneumatic valve actuator and a supply of pneumatic pressure for controlling the rotary movement of said actuator output shaft, transducer means coupled to said spool valve and responsive to a control signal for effecting axial displacement of said spool valve away from a predetermined neutral position when it is desired to effect rotation of said output shaft, and a feedback mechanism responsive to the rotary movement of said rotatable output shaft for generating a force in opposition to the force generated in said transducer means by said control signal for returning said slide valve to its said neutral position when said output shaft has rotated to a desired position, the improvement wherein said feedback mechanism comprises a rotatable element adapted to be coupled to said output shaft of said pneumatic valve actuator for rotation with rotation of said shaft, an elongated spring beam attached at one end thereof to said rotatable element and extending as a cantilever from said element in a direction transverse to the direction of rotation of said rotatable element, and means coupling the other end of said cantilever spring beam to said transducer means for producing a spring force in opposition to the force produced by said transducer means, rotation of said valve actuator output shaft being operative to cause said cantilever spring beam to flex in its direction of elongation as said rotatable element rotates thereby to vary the spring force which is applied by said cantilever spring beam to said transducer means until the spring force produced by said cantilever spring beam balances the control signal responsive transducer force which is being applied to said spool valve.

2. The valve positioner of claim 1 wherein said transducer means is a pneumatic transducer responsive to a pneumatic pressure control signal.

3. The valve positioner of claim 2 wherein said pneumatic transducer comprises a circular pressure responsive diaphragm positioned in a plane transverse to the direction of elongation of said spool valve, said diaphragm being connected to said spool valve by a mechanical linkage including an elongated, hollow sleeve co-axial with said spool valve, an aperture in a side of said sleeve, said other end of said cantilever spring beam extending in a direction transverse to the direction of elongation of said sleeve through said aperture to the interior of said sleeve, and an elongated fulcrum lever located within said sleeve in spaced relation to the interior walls of said sleeve and extending between the center of said diaphragm and said other end of said cantilever spring beam.

4. The valve positioner of claim 3 wherein one end of said elongated fulcrum lever engages said diaphragm at a point in the plane of said diaphragm, said lever being adapted to tilt when said spring beam flexes to prevent lateral shifting of the point of engagement of said one end of said fulcrum lever relative to said diaphragm.

5. The valve positioner of claim 4 wherein said elongated sleeve includes a further aperture opposite to said first-mentioned aperture, said cantilever spring beam extending through both of said apertures, and seat means on the portion of said spring beam between said apertures for engagement with the other end of said elongated fulcrum lever.

6. The valve positioner of claim 1 including gear means interconnecting said rotatable output shaft to said rotatable element for rotating said element through an angular extent smaller than that of said output shaft, said rotatable element including fulcrum means thereon in engagement with said cantilever spring beam at a position on said spring beam displaced from the point of attachment of said spring beam to said rotatable element.

7. The valve positioner of claim 6 wherein said gear means comprises a comparatively small first gear connected to said output shaft and a larger second gear in mesh engagement with said first gear, said rotatable element including a carrier plate attached to said second gear.

8. The valve positioner of claim 7 including adjustment means on said carrier plate for selectively varying the position at which said fulcrum means engages said cantilever spring beam.

9. The valve positioner of claim 7 including adjustment means on said carrier plate for selectively varying the force with which said fulcrum means engages said cantilever spring beam.

10. The valve positioner of claim 3 wherein said one end of said cantilever spring beam is attached to said rotatable element at a point radially offset from the axis of rotation of said element, the position of said point of attachment and the amount of radial offset of said one end of said spring beam being so selected that the other end of said spring beam remains at a position substantially coaxial with the center of said diaphragm as said spring beam is flexed.

11. The valve positioner of claim 1 wherein said other end of said cantilever spring beam is substantially co-axial with said spool valve, said one end of said cantilever spring beam being attached to said rotatable element at a point radially offset from the axis of rotation of said element, the amount of said radial offset being so selected that the other end of said cantilever spring beam is maintained at a position substantially co-axial with said spool valve as said spring beam is flexed.

12. The valve positioner of claim 1 including gear means between said rotatable element and said rotatable output shaft operative upon rotation of said shaft to rotate said rotatable element through a substantially smaller angle than said output shaft is rotated.

* * * * *